(12) United States Patent
Kouketsu

(10) Patent No.: US 7,727,459 B2
(45) Date of Patent: Jun. 1, 2010

(54) METHOD OF MANUFACTURING CERAMIC HONEYCOMB STRUCTURE

(75) Inventor: Naoto Kouketsu, Toki (JP)

(73) Assignee: NGK Insulators, Ltd., Nagoya (JP)

( * ) Notice: Subject to any disclaimer, the term of this patent is extended or adjusted under 35 U.S.C. 154(b) by 1209 days.

(21) Appl. No.: 11/268,513

(22) Filed: Nov. 8, 2005

(65) Prior Publication Data

US 2006/0103057 A1 May 18, 2006

(30) Foreign Application Priority Data

Nov. 17, 2004 (JP) ............................. 2004-333429

(51) Int. Cl.
*B28B 1/38* (2006.01)
(52) U.S. Cl. ...................................... 264/630
(58) Field of Classification Search ................. 264/630, 264/631
See application file for complete search history.

(56) References Cited

U.S. PATENT DOCUMENTS 4,557,773 A 12/1985 Bonzo
4,559,193 A 12/1985 Ogawa et al.
2002/0020944 A1* 2/2002 Yamaguchi et al. ......... 264/400
2003/0160366 A1 8/2003 Fukuta et al.
2005/0120691 A1 6/2005 Miwa

FOREIGN PATENT DOCUMENTS

JP A 2001-300922 10/2001
WO WO 03/076773 A1 9/2003

\* cited by examiner

*Primary Examiner*—Steven P Griffin
*Assistant Examiner*—Erin Snelting
(74) *Attorney, Agent, or Firm*—Oliff & Berridge, PLC

(57) ABSTRACT

There is disclosed a method of manufacturing a ceramic honeycomb structure, which is capable of controlling a length of slurry pressed into each cell of the honeycomb structure when predetermined cells are plugged at an end surface of the honeycomb structure. A film 4 is attached to an end surface of the honeycomb structure 1. Holes 3a, 3b through the film 4 are made at a position corresponding to openings of predetermined cells 2a, 2b. The end surface is immersed into slurry 6 stored in a container 5 and the end surface is pressed so that the slurry 6 is pressed into the openings of the predetermined cells 2a, 2b. When the holes are made, two or more types of holes 3a, 3b having different diameters are made.

2 Claims, 7 Drawing Sheets

PRESSING

PRESSING

RELATED ART

METHOD OF MANUFACTURING CERAMIC HONEYCOMB STRUCTURE

BACKGROUND OF THE INVENTION

1. Field of the Invention

The present invention relates to a method of manufacturing a ceramic honeycomb structure which is preferably usable in a filter such as a diesel particulate filter and in which predetermined cells are plugged at end surfaces.

2. Description of the Related Art

As a dust collecting filter represented by a diesel particulate filter (hereinafter referred to as "DPF"), a ceramic filter having a honeycomb structure is used. This filter has a structure of a porous honeycomb structure having a large number of cells partitioned by partition walls and extending in an axial direction. In addition, each cell is plugged at one end surface so that adjacent cells are plugged at opposite end surfaces in such a manner that an end surface has a checkered pattern.

When an exhaust gas is passed through the honeycomb structure from one end surface thereof, exhaust gas including micro particles such as particulates flows into the structure from the cell which is not plugged at the end surface. Then the gas passes through the porous partition wall to enter other cells that are not plugged at the other end surface of the structure. When the gas passes through the partition wall, the partition wall captures the particulates in the exhaust gas. The purified exhaust gas from which the particulates have been removed is discharged from the other end surface of the honeycomb structure.

Usually, when manufacturing the honeycomb structure in which predetermined cells are plugged at the end surface in this manner, as shown in FIG. 9, a method is applied in which a film 4 is attached as a mask to the end surface of a honeycomb structure 1, and holes 3 through the film 4 are made at positions corresponding to openings of predetermined cells 2a, 2b. The end portion of the honeycomb structure 1 is immersed into a container 5 in which plugging slurry 6 is stored. Then the end surface is pressed so that the plugging slurry 6 is pressed into the openings of the predetermined cells 2a, 2b through the holes 3 of the film 4 (see, e.g., JP-2001-300922A).

In a case where the predetermined cells are plugged in the above-described method, diameters of the holes 3 disposed in the film 4 have heretofore been set to be equal. However, when the holes 3 having the equal diameters are simply disposed in the film 4 constituting the mask, a length of the plugging slurry 6 pressed into the respective cells 2a, 2b to be plugged is not uniformed in many cases. In general, as shown in FIG. 9, the plugging slurry pressed into the cells 2a in the vicinity of an outer periphery of the honeycomb structure 1 tends to become shorter in length than that pressed into the cells 2b in a central portion.

Moreover, when the length of the plugging slurry pressed into each cell to be plugged is non-uniform in this manner, pressure loss in each cell fluctuates, and there occurs a disadvantage that an amount of deposition in each cell varies.

SUMMARY OF THE INVENTION

The present invention has been developed in view of such conventional circumstances. An object thereof is to provide a method of manufacturing a ceramic honeycomb structure, which is capable of controlling a length of a plugging slurry pressed into each cell to be plugged when predetermined cells are plugged at an end surface of the honeycomb structure.

According to the present invention, there is provided a method of manufacturing a ceramic honeycomb structure, comprising the steps of: attaching a film constituting a mask to an end surface of the ceramic honeycomb structure having a large number of cells partitioned by partition walls and extending in an axial direction; making holes through the film at positions corresponding to openings of predetermined cells; immersing the end surface of the ceramic honeycomb structure into plugging slurry stored in a container and pressing the end surface so that the plugging slurry is pressed into the openings of the predetermined cells through the holes of the film, thereby plugging the predetermined cells at the end surface, wherein two or more types of the holes having different diameters are made in the step of making holes.

According to the present invention, in a case where the ceramic honeycomb structure in which the predetermined cells are plugged at the end surface is manufactured, a length of the plugging slurry pressed into each cell to be plugged can be controlled. Consequently, the length of the plugging slurry pressed into each cell can be uniformed.

DESCRIPTION OF THE PREFERRED EMBODIMENT

As described above, the present invention relates to a method of manufacturing a ceramic honeycomb structure. In the method, a film constituting a mask is attached to an end surface of the ceramic honeycomb structure having a large number of cells partitioned by partition walls and extending in an axial direction. Then, holes through the film are made at positions corresponding to openings of predetermined cells. The end surface of the ceramic honeycomb structure is immersed into plugging slurry stored in a container, and the end surface is pressed so that the plugging slurry is pressed into the openings of the predetermined cells through the holes of the film to plug the openings. Consequently, the predetermined cells are plugged at the end surface. As a characteristic constitution of the present invention, two or more types of holes having different diameters are made, when making the holes in the film.

First, as a basic principle, the larger the diameter of the hole disposed in the film is, the lower an inflow resistance becomes in a case where the plugging slurry is pressed into the openings of the cells through the holes. Therefore, the plugging slurry is easily pressed into a deep position.

Figure 2:
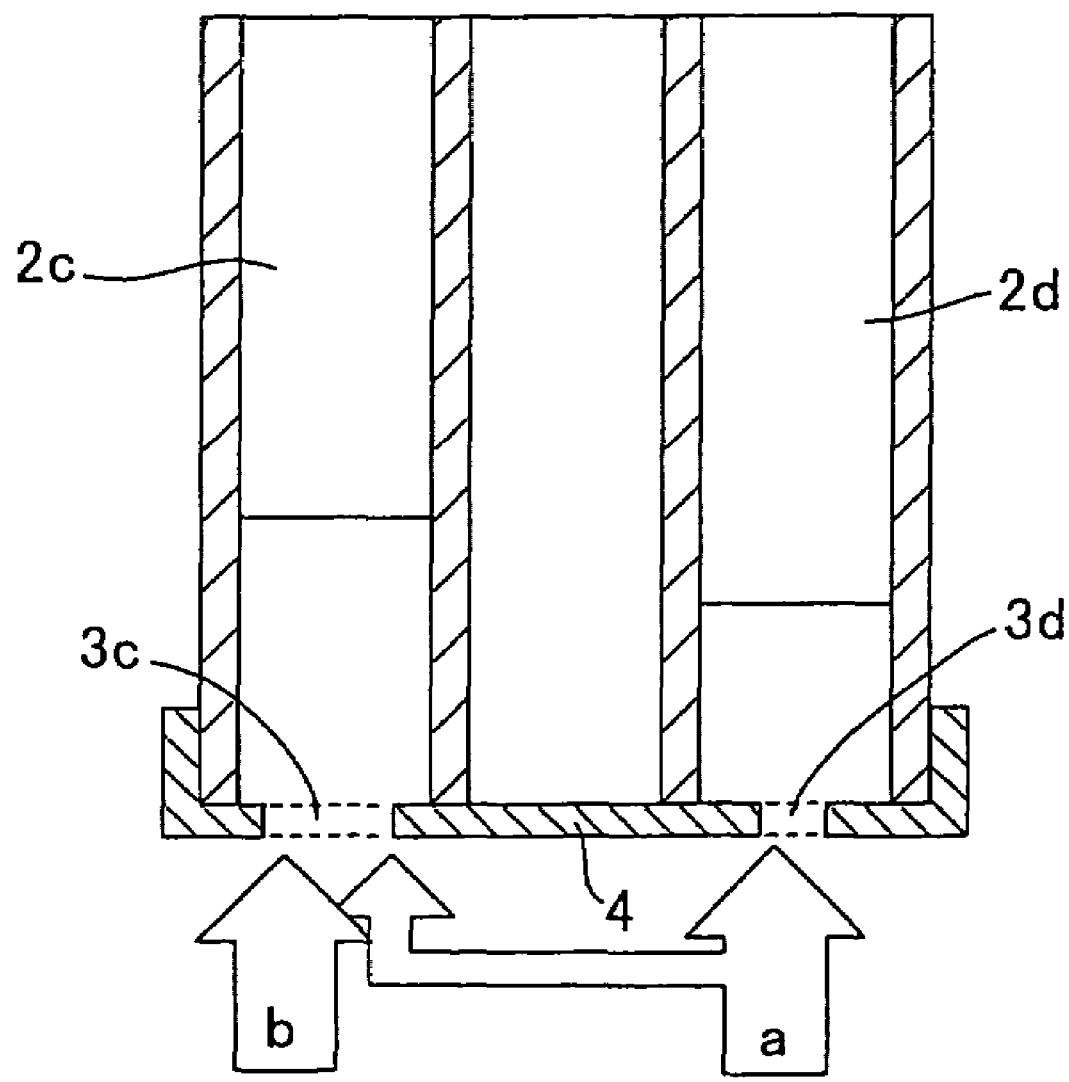
FIG. 2 is an explanatory view showing a flowing state of plugging slurry.

Moreover, as shown in FIG. 2, in a case where the diameters of holes 3c, 3d corresponding to neighboring cells 2c, 2d, respectively, are different, a flowing state of the plugging slurry in the container changes as compared with a case where these diameters are equal. That is, in a case where a time required for the slurry filling is fixed, the inflow resistance is high, and the plugging slurry does not easily flow into the cell 2d on a side on which the diameter of the corresponding hole 3d is small. Therefore, an amount of plugging slurry "a" in a position of the container facing the cell 2d becomes excessive. On the other hand, the inflow resistance is low, and the plugging slurry easily flows into the cell 2c on a side on which the diameter of the corresponding hole 3c is large. Therefore, an amount of plugging slurry "b" in a position of the container facing the cell comes short. To compensate for the shortage, a part of the plugging slurry "a" flows together with the plugging slurry "b" into the cell 2c on the side on which the diameter of the corresponding hole 3c is large. As a result, a supply amount of the plugging slurry into the cell 2c on the side on which the diameter of the corresponding hole 3c is large increases, and the plugging slurry is filled into a deeper position as compared with a case where the diameters of the holes corresponding to the neighboring cells, respectively, are set to be equal.

As described above, the length of the plugging slurry pressed into the cell to be plugged can be controlled depending on the diameter of the hole. When two or more types of holes having different diameters are disposed, the lengths of the plugging slurry pressed into a large number of cells can be uniformed.

Figure 1:
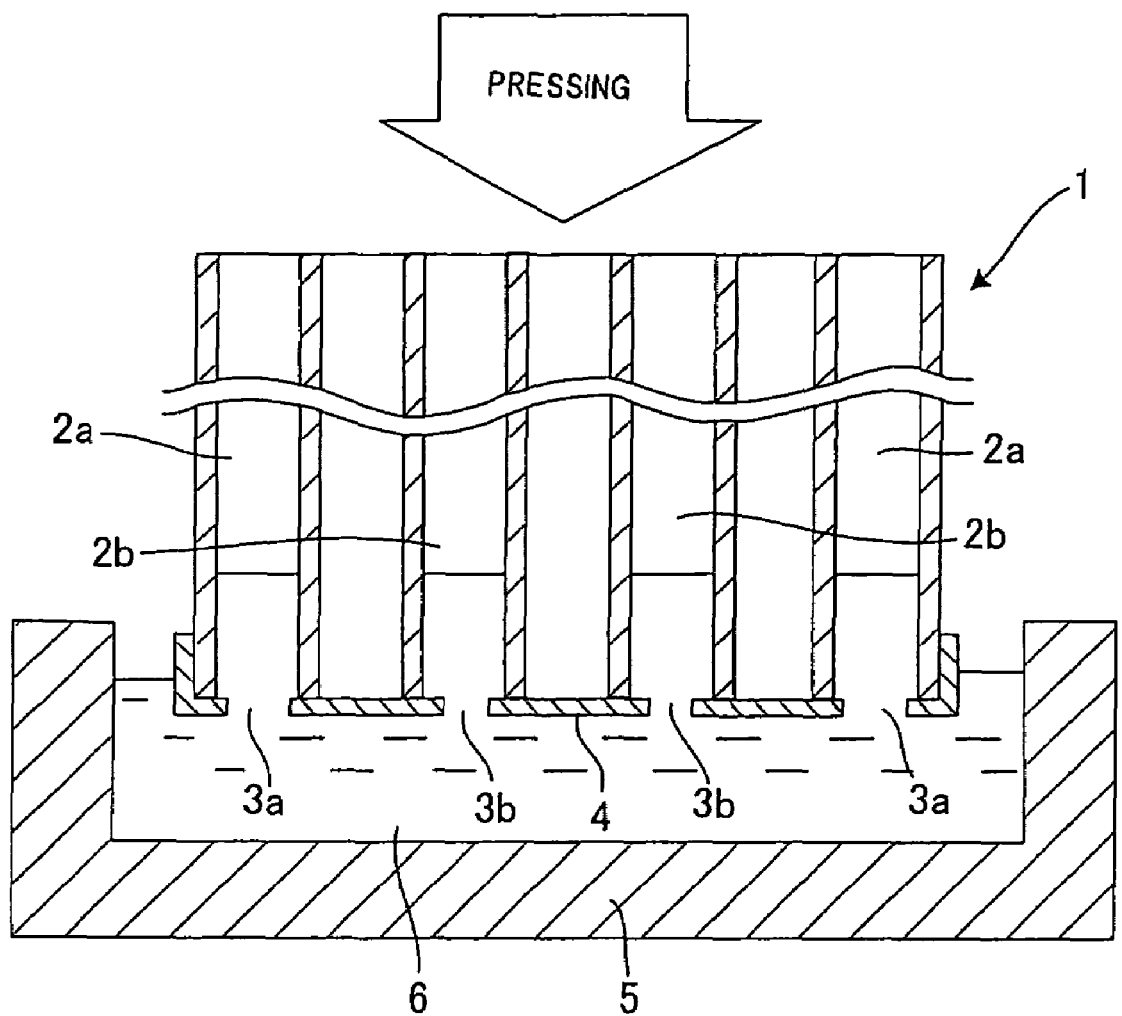
FIG. 1 is an explanatory view showing one example of an embodiment of the present invention.
Figure 9:
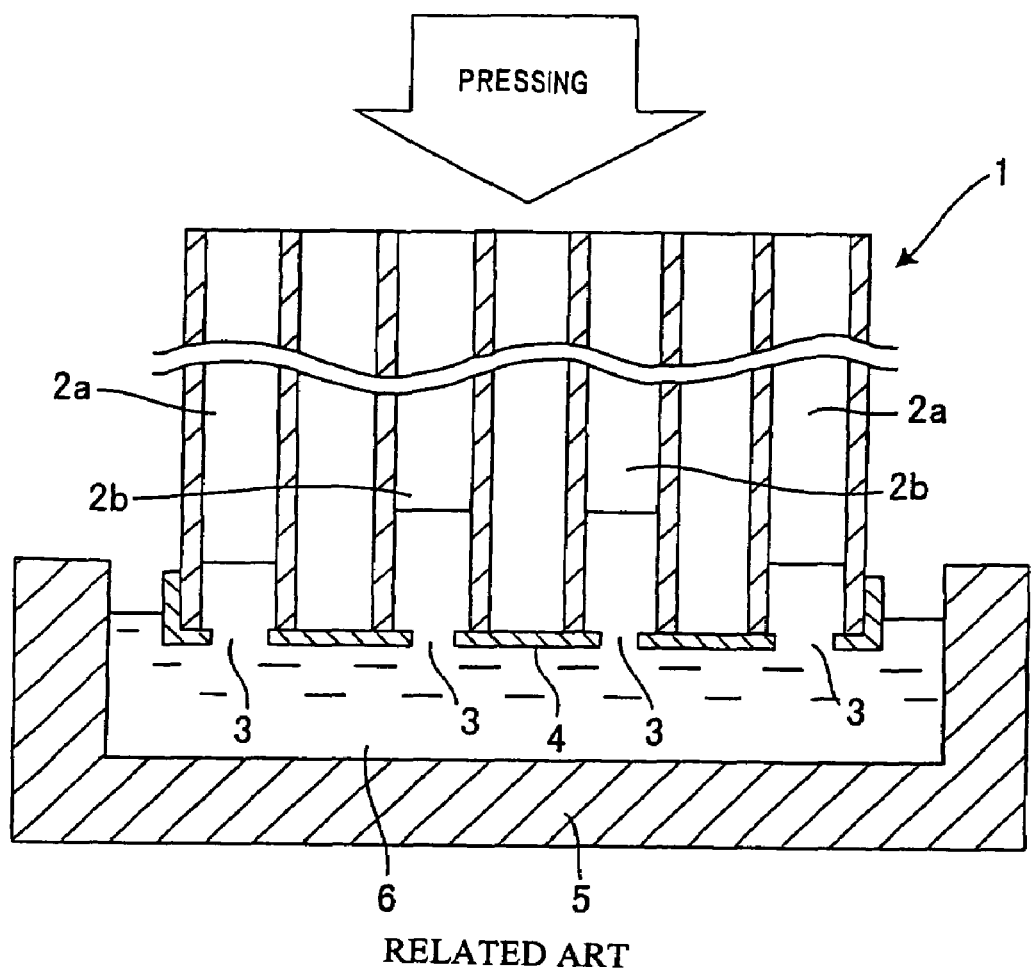
FIG. 9 is an explanatory view showing a conventional manufacturing method.

For example, in a case where the holes have the equal diameters as described above, in general, the plugging slurry pressed into the cells located in the vicinity of an outer periphery of the ceramic honeycomb structure tends to be shorter in length than that pressed into the cells located in the central portion (see FIG. 9). Therefore, to uniform the length of the plugging slurry pressed into the cell, as shown in FIG. 1, the diameter of each hole 3a through a film 4 disposed in a position corresponding to the opening of each cell 2a located in the vicinity of the outer periphery of a honeycomb structure 1 is set to be larger than that of each hole 3b through the film 4 disposed in a position corresponding to the opening of each cell 2b located in the central portion of the honeycomb structure 1. In this case, when the end surface of the honeycomb structure 1 is immersed in plugging slurry 6 stored in a container 5, and the end surface is pressed to the container 5, the plugging slurry 6 easily flows into the cells 2a in the vicinity of the outer periphery of the honeycomb structure 1. On the other hand, the slurry does not easily flow into the cells 2b in the central portion. Therefore, the length of the plugging slurry pressed into each cell is uniformed.

Since the length of the plugging slurry pressed into the cell is largely influenced by the position of the cell in this manner, the diameter of the hole disposed in the position corresponding to the opening of the predetermined cell is preferably varied depending on the position of the opening of the predetermined cell to be plugged. For example, the end surface of the ceramic honeycomb structure is divided into a plurality of areas, and the diameter of the hole through the film positioned on the area may be determined for each area. In this case, a shape of each area, a region, the number of divided areas and the like are not especially limited, and they are appropriately determined if necessary. It is to be noted that the diameter of each hole required for bringing into a desired distribution of the lengths of the plugging slurry pressed into the respective cells can be determined by repeating several trials while changing the diameter of the hole.

In the present invention, the method of attaching the film constituting the mask to the end surface of the ceramic honeycomb structure, and making the holes are not especially limited. Examples of the method include a method in which an adhesive film is attached to the whole end surface of the ceramic honeycomb structure, and the adhesive film is partially perforated. More specifically, a method is preferable in which after attaching the adhesive film to the whole end surface of the ceramic honeycomb structure, the position of the adhesive film corresponding to the opening of the cell to be plugged is irradiated with laser to make the hole through the film. As the adhesive film, it is preferably used that a film made of a resin such as polyester, polyethylene, or thermosetting resin and whose one surface is coated with an adhesive.

As another method, for example, the hole may be made one by one with a needle, or numbers of holes are made together by use of needles in the form of a needlepoint holder (or KENZAN) corresponding to a pitch of the opening of the cell to be plugged. In another preferable method, in order to cope with a ceramic honeycomb structure in which the cell pitch or shape is not constant, the end surface of the ceramic honeycomb structure is image-processed to extract the data of the position of the cell to be plugged, and each hole having a desired diameter is made in a corresponding position in the film by a laser marker.

Figure 3:
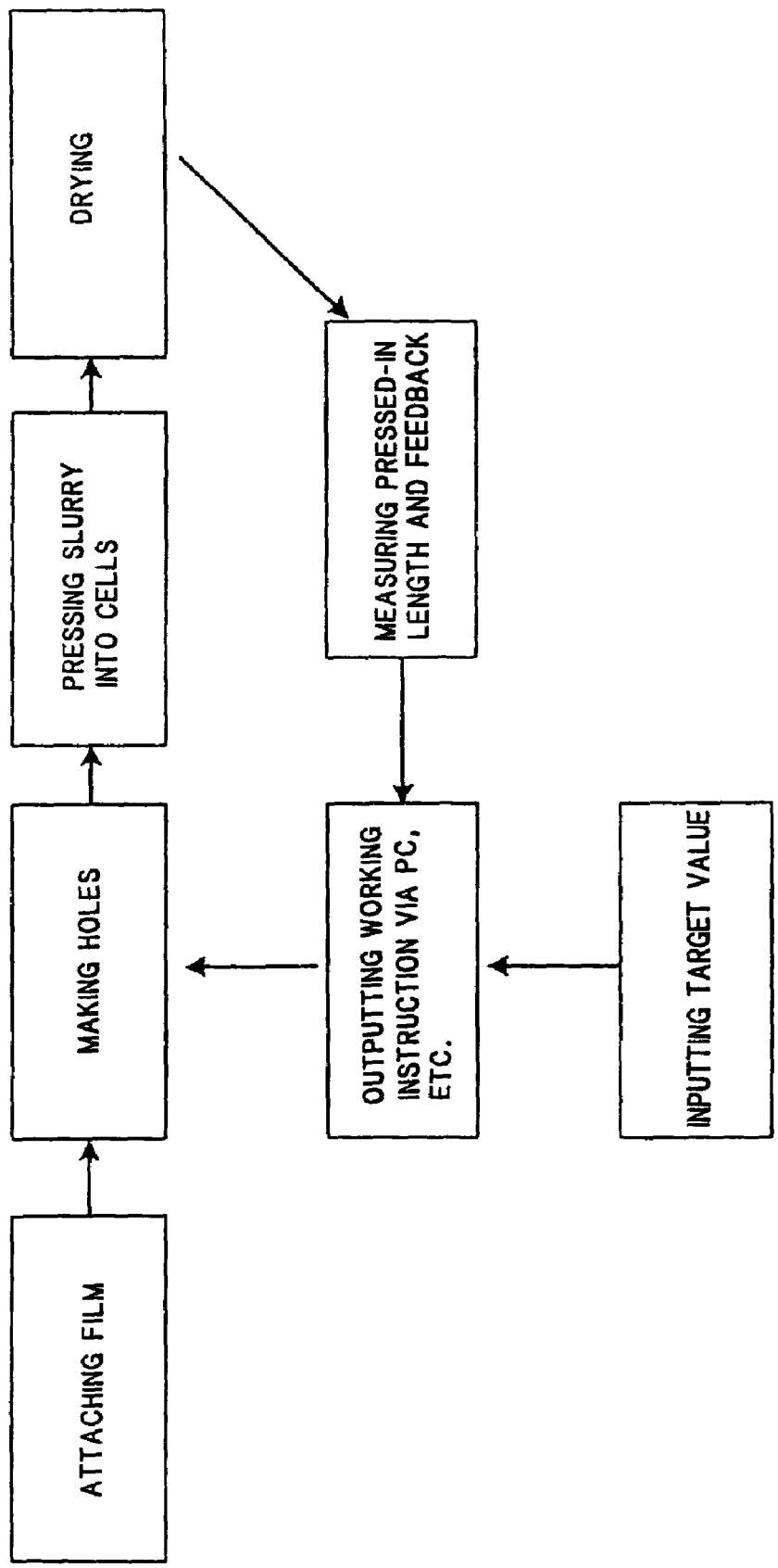
FIG. 3 is an explanatory view showing one example of a method of controlling a diameter of a hole by an automatic control system.

Furthermore, in a case where the ceramic honeycomb structures having the same structure are mass produced, an automatic control system may be used. In the system, for example, in accordance with the steps shown in FIG. 3, information of the length of the plugging slurry actually pressed into the cell is detected in real time. The information is fed back to thereby control an output or the like of the laser marker to change the diameter of the hole appropriately so that the length of the plugging slurry pressed into the cell comes close to a more desired value. This is a system utilizing merit obtained by adopting the diameter of the hole by the laser marker which can be quickly and finely adjusted as a control factor with respect to the length of the plugging slurry pressed into the cell.

Figure 4:
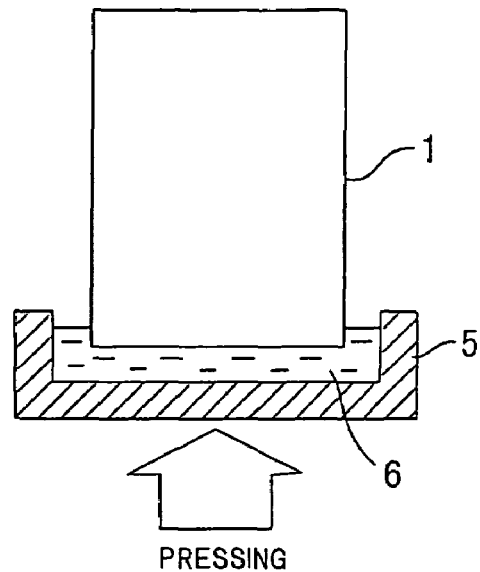
FIG. 4 is an explanatory view showing one example of a method of pressing an end surface of a ceramic honeycomb structure against the plugging slurry.
Figure 5:
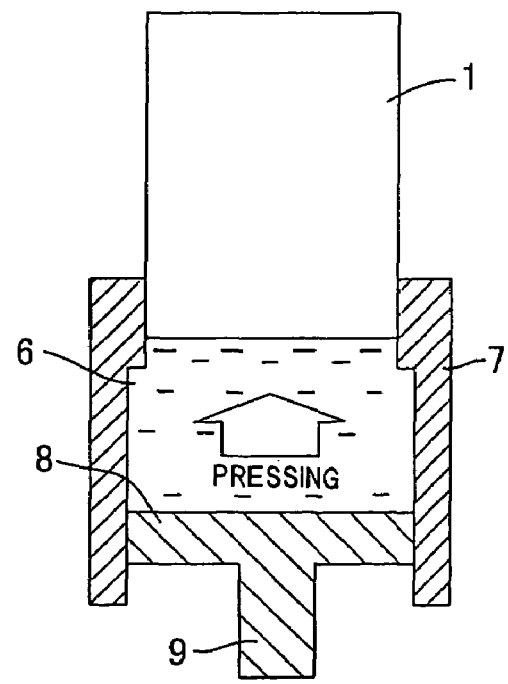
FIG. 5 is an explanatory view showing one example of a method of pressing the end surface of a ceramic honeycomb structure against the plugging slurry.

In the present invention, the end surface of the ceramic honeycomb structure to which such film has been attached is immersed into the plugging slurry stored in the container, and the end surface is pressed against the plugging slurry. Accordingly, the plugging slurry is pressed into the cell to be plugged through the hole of the film. In this case, as a pressing method, in addition to a method in which the honeycomb structure 1 is pressed toward an inner bottom surface of the container 5 from the end surface opposite to that immersed into the plugging slurry 6 as shown in FIG. 1, the container 5 may be pressed onto the end surface of the honeycomb structure 1 as shown in FIG. 4. Alternatively, as shown in FIG. 5, a cylinder-like container 7 is used whose inner bottom surface 8 is movable by a piston 9. The inner bottom surface 8 may be moved toward the end surface of the honeycomb structure 1, so that the end surface of the honeycomb structure 1 is relatively pressed with respect to the plugging slurry 6 in the container.

The plugging slurry may be prepared by mixing at least a ceramic powder and a dispersion medium (e.g., water, etc.). Furthermore, if necessary, additives may be added such as a binder and a deflocculant. A material of the ceramic powder is not especially limited, and, for example, silicon carbide powder, cordierite or the like is preferably usable. As the binder, a resin such as polyvinyl alcohol (hereinafter referred to as "PVA") is usable, and it is more preferable to use a thermal gelation binder having a property that the binder is gelled by heat. As the thermal gelation binder, methylcellulose is preferably usable.

Viscosity of the plugging slurry is generally adjusted into about 5 to 50 Pa·s, preferably in a range of 15 to 40 Pa·s. When the viscosity of the plugging slurry is excessively low, there is reduced a flow resistance difference due to a difference in the diameter between the holes in a case where the plugging slurry passes through the hole of the film. This unfavorably reduces an effect of the present invention that the diameter of the hole is changed to thereby control the length of the plugging slurry pressed into the cell.

On the other hand, when the viscosity of the plugging slurry is excessively high, the flow resistance during the passing of the plugging slurry through the hole of the film is excessively high. Therefore, the length of the plugging slurry pressed into the cell becomes excessively short in a case where the diameter of the hole is set to be small. Additionally, the slurry has a strengthened tendency to keep a shape of the hole after passing through the hole of the film. Therefore, a contact area of the slurry with the cell walls unfavorably decreases, and incomplete plugging results. It is to be noted that the viscosity of the plugging slurry can be adjusted by, for example, a ratio of the ceramic powder to the dispersion medium (e.g., water, etc.), an amount of the deflocculant, or the like.

There is not any special restriction as to a specific material, dimension, outer peripheral shape, cell shape, cell density, partition wall thickness, porosity and the like of the ceramic honeycomb structure for use in the present invention, and they can be appropriately selected depending on applications or the like.

EXAMPLES

The present invention will be described hereinafter in accordance with examples in more detail, but the present invention is not limited to these examples.

A material powder containing a silicon carbide powder as a main component was kneaded to form clay, the clay was extruded and dried, thereafter opposite end surfaces were cut to form smooth surfaces, and accordingly two types of honeycomb structures A, B were obtained. The honeycomb structure A has a square cell shape, an outer dimension of 36.5 mm×36.5 mm×254 mm, a partition wall thickness of 0.3 mm, and a cell density of 300 cells/inch². The honeycomb structure B is the same as the honeycomb structure A except that the partition wall thickness is 0.38 mm and the cell density is 200 cells/inch².

Figure 6:
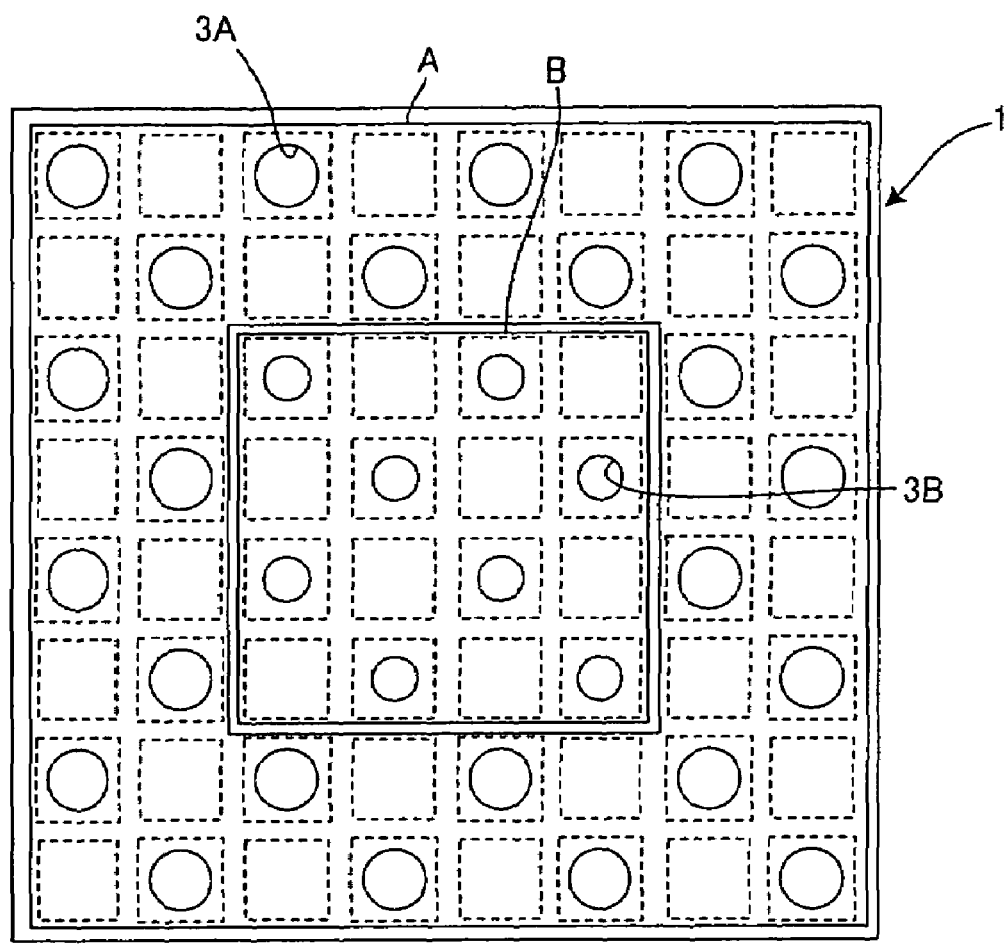
FIG. 6 is an explanatory view showing an area dividing state in the Example.

As to each of the honeycomb structures A, B, in order to plug adjacent cell openings alternately in the end surface (i.e., plug the openings in such a manner that the end surface has a checkered pattern), an adhesive film was first attached to a whole end surface. The adhesive film is a polyester film coated with an adhesive on one surface thereof. Thereafter, cell positions were calculated by image processing to obtain a coordinate value corresponding to a position of the opening of the cell to be plugged, and a hole was made only in a portion of the adhesive film corresponding to the coordinate value by laser. In this case, as to the honeycomb structure A, as shown in FIG. 6, the end surface of the honeycomb structure 1 was divided to the area A that is a region of two rows of cells from an outer periphery, and the area B that is an inner region of the area A. Among the cells to be plugged, the diameter of the hole 3A (hereinafter referred to as the "area A hole") disposed in the position corresponding to the opening of each cell in the area A was fixed to 1.05 mm. On the other hand, the diameter of the hole 3B (hereinafter referred to as the "area B hole") disposed in the position corresponding to the opening of each cell in the area B was varied in a range of 1.05 to 0.36 mm. In addition, as to the honeycomb structure B, the area was similarly divided, and the diameter of the area A hole 3A was fixed to 1.30 mm. The diameter of the area B hole 3B was changed in a range of 1.30 to 0.51 mm.

After making the holes in the film in this manner, the end surfaces of the honeycomb structures A and B to which the films were attached were immersed into the plugging slurry stored in the container, and pressed toward inner bottom surfaces of the container. The plugging slurry was pressed into the cells to be plugged through the holes of the film. In this case, in a state that the end surface of each honeycomb structure provided with the film faces to the inner bottom surface of the container, the honeycomb structure was set in such a manner that the axial direction of the honeycomb structure was vertical to a liquid surface of the plugging slurry in the container. The honeycomb structure was pressed toward the inner bottom surface of the container at a press of 0.05 to 0.4 MPa.

Thereafter, the honeycomb structure was taken out of the container, and plugged portions were dried using a hot air drying furnace. After drying the plugging slurry pressed into the cells in this manner, a length (pressed-in length) of the plugging slurry pressed into the cell was measured. Results are shown in graphs of FIG. 7 (results of the honeycomb structure A) and FIG. 8 (results of the honeycomb structure B). It is to be noted that in these figures, values of the pressed-in lengths of the areas A and B are average values of the pressed-in lengths of the plugged cells in the respective areas.

Figure 7:
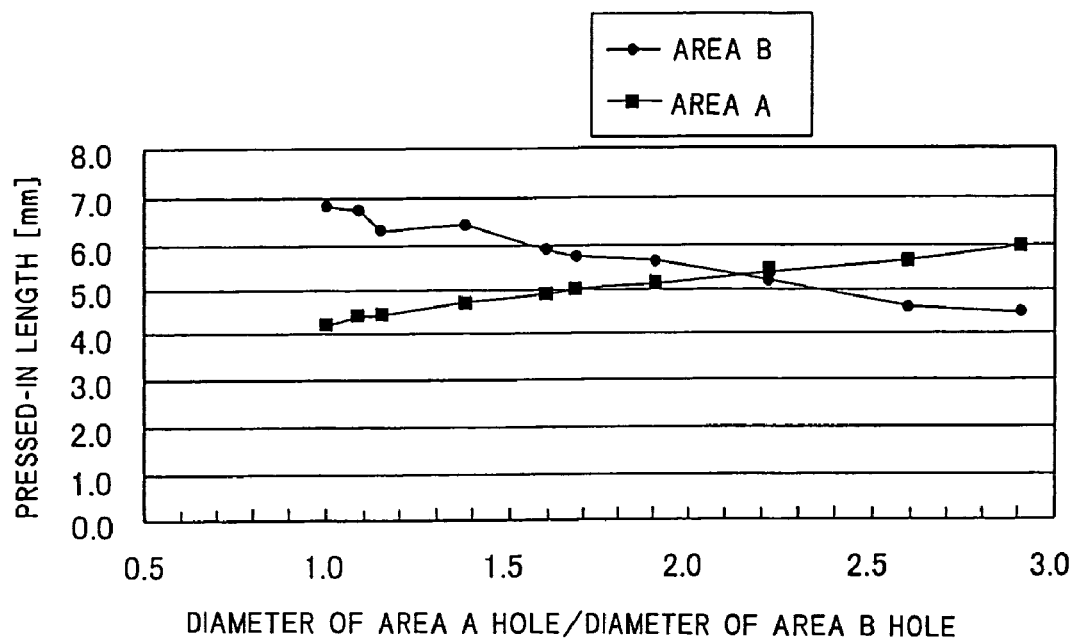
FIG. 7 is a graph showing results of the Example.
Figure 8:
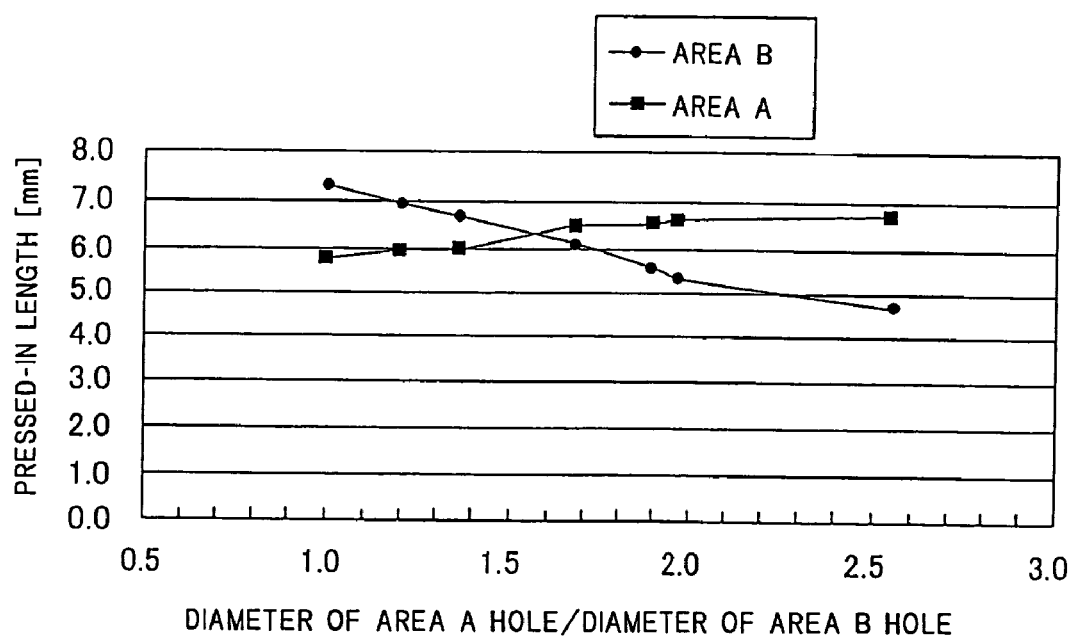
FIG. 8 is a graph showing results of the Example.

As described above, in the present example, changes of the pressed-in lengths were checked in a case where the diameter of each area A hole was fixed, and the diameter of each area B hole was varied. As shown in FIGS. 7 and 8, the smaller the diameter of the area B hole is (the larger "diameter of area A hole/diameter of area B hole" in the figure is), the higher the inflow resistance of the plugging slurry flowing into each cell in the area B is. Therefore, the pressed-in length of each cell in the area B is short. Although the diameter of the area A hole is fixed, the pressed-in length of the cell in the area A is great as the diameter of the area B hole decreases. This is because a part of the plugging slurry that does not easily flow into the cell in the area B owing to the reduction of the diameter of the area B hole flows into the cell in the area A having a low inflow resistance.

It is to be noted that the pressed-in lengths of the cells in the areas A and B are substantially uniform, when the "diameter of area A hole/diameter of area B hole" in FIG. 7 is about 2.1 in the honeycomb structure A, and that in FIG. 8 is about 1.6 in the honeycomb structure B.

The present invention is preferably usable as a method of manufacturing the honeycomb structure for use in a filter such as a DPF.

What is claimed is:

1. A method of manufacturing a ceramic honeycomb structure, comprising the steps of:
   attaching a film constituting a mask to an end surface of the ceramic honeycomb structure having a plurality of cells partitioned by partition walls and extending in an axial direction;
   making holes through the film at positions corresponding to openings of required cells;
   immersing the end surface of the ceramic honeycomb structure into plugging slurry stored in a container and pressing the end surface so that the plugging slurry is pressed into the openings of the required cells through the holes of the film, thereby plugging the required cells at the end surface, wherein a portion of the film attached to the end face of the honeycomb structure is divided into at least two areas when the holes are made in the film, the at least two areas including a first area and a second area, the holes to be formed in the at least two areas are formed with respective diameters that allow the plugging slurry to flow into the cells with a substantially uniform pressed-in length regardless whether a hole is in the first area or the second area, when the end surface of the honeycomb structure to which the film is attached is immersed into the plugging slurry stored in the container, and the diameters of the holes at the positions corresponding to the openings of the required cells located in a vicinity of an outer periphery of the ceramic honeycomb structure are set to be larger than those of the holes at the positions corresponding to the openings of the required cells located in a central portion of the ceramic honeycomb structure.

2. The method of manufacturing the ceramic honeycomb structure according to claim 1, wherein the diameter of a hole at a position corresponding to the opening of a required cell is varied depending on a position of the opening of the required cell.

* * * * *